United States Patent
Press et al.

(10) Patent No.: US 6,980,571 B1
(45) Date of Patent: Dec. 27, 2005

(54) LASER CUTTING METHOD AND SYSTEM

(75) Inventors: Richard L. Press, Ben Lomond, CA (US); George A. Shukov, Los Altos Hills, CA (US)

(73) Assignee: LPL Systems, Inc., Mountain View, CA (US)

( * ) Notice: Subject to any disclaimer, the term of this patent is extended or adjusted under 35 U.S.C. 154(b) by 300 days.

(21) Appl. No.: 10/147,754

(22) Filed: May 17, 2002

(51) Int. Cl.$^7$ ............................................. H01S 3/11
(52) U.S. Cl. ............................................. 372/10; 372/25
(58) Field of Search ............................ 372/36, 70–74, 372/12, 105, 21, 37, 20, 10–28, 29.011–32, 372/33, 34, 22, 25, 106

(56) References Cited

U.S. PATENT DOCUMENTS

| | | | | |
|---|---|---|---|---|
| 5,611,946 A | * | 3/1997 | Leong et al. | 219/121.6 |
| 5,742,634 A | * | 4/1998 | Rieger et al. | 372/25 |
| 6,078,598 A | * | 6/2000 | Ohtsuki et al. | 372/12 |
| 6,472,295 B1 | * | 10/2002 | Morris et al. | 438/463 |

* cited by examiner

Primary Examiner—Minsun Oh Harvey
Assistant Examiner—Tuan N Nguyen
(74) Attorney, Agent, or Firm—MacPherson Kwok Chen & Heid LLP

(57) ABSTRACT

Material is laser milled by generating a series of laser pulses, each pulse possessing a main portion and a tail, and preventing the energy in one or more portions of the pulse, from striking the material being processed. In one embodiment this is done by terminating the pulse before a portion of the tail is generated, thereby to reduce thermal stress and leave smooth edges on the laser-milled material.

8 Claims, 5 Drawing Sheets

Q-switched output with tail

Lamp output

Lamp current

5a Laser pulse with tail

5b Laser pulse without tail

5c RF signal

US 6,980,571 B1

LASER CUTTING METHOD AND SYSTEM

FIELD OF THE INVENTION

This invention relates to the laser cutting of materials and in particular to a process and system by which the throughput of laser cutting systems is substantially improved compared to the prior art.

BACKGROUND OF THE INVENTION

Laser cutting (also called "laser milling", "laser etching", or "laser machining") of materials is well known. Typically, a laser beam is directed at the material to be cut until the material is melted and then blown out of the melt zone by a high pressure assist gas, thereby leaving an open space (commonly called a kerf). One problem with laser cutting systems is that after the laser cutting has removed the unwanted material, the material left adjacent to the kerf has suffered thermal stress, has melted near the edges and often has fused in such a way as to create possible stress. Thermal stress results when additional heat, beyond what is necessary to form the kerf, melts additional material along the edge of the kerf. This additional material typically recasts (i.e. "reforms") along the edge of the kerf. Accordingly, a process and system are needed which will reduce the thermal stress and minimize or eliminate the stress points and fused material associated with the remaining material near the kerf.

SUMMARY OF THE INVENTION

In accordance with this invention, a method and system are provided by which material is removed using a laser beam such that the remaining material experiences substantially reduced thermal stress and is left with much smoother edges adjacent to the removed material. In the work leading to this invention, it was recognized that one of the causes for thermal stress on the remaining material is the fact that laser cutting is done using pulses. Typically, these pulses are not stable in the sense that a charge builds in the lasing material and ultimately a laser output pulse is produced which then decays as shown in FIG. 1. This decay, sometimes called a fluorescent decay, is quite short, less than 230 microseconds. However, for a narrow pulse width of 50 to 150 microseconds, this fluorescent decay is quite substantial. This fluorescent decay adds additional energy to the cut material which thermally stresses the material remaining adjacent to the kerf. In accordance with this invention a method and system are provided for reducing or eliminating the effect of the fluorescent decay on the cut material.

In one embodiment, a pump source of light is provided adjacent a laser material. The pump source is pulsed to provide energy to the laser material which, when energized sufficiently, produces an output pulse of coherent light. The coherent light is passed through a transmission mechanism, typically a Bragg cell, which serves as an acousto-optic switch, which, when switched, will suppress the Q of the resonator. The laser pulse which has passed through the transmission medium is then sent to the material being etched. At the end of the laser pulse, an RF field is applied to the Bragg cell (the Bragg cell is basically a quartz crystal with a transducer on one side which propagates an acoustic wave through the Bragg cell to change the index of refraction) to switch (i.e. lower) the Q of the resonator to thereby abruptly shut off the laser pulse and thus terminate the fluorescent decay portion of the pulse thereby preventing this tail portion of the laser output pulse from heating the material being milled. As a result, the thermal stress associated with the prior art laser milling process is substantially reduced or eliminated. The volume of molten material is also reduced. This reduces the volume of slag, or particles, recast onto the cut edge.

One advantage of this invention is that the throughput of the laser milling system is substantially increased. While typical prior art laser milling systems cut at a given rate, in accordance with this invention the cutting rate is increased by a factor of 2 to 3 or more. This invention is particularly useful for very fine etching associates with, for example, biomedical stents used by doctors to open arteries which have been clogged with plaque. Such stents are typically cylindrical in shape but are very small in diameter (1.0 millimeter to 3.0 millimeters). The laser cutting of the tubular material is done on a laser lathe. The material is advanced into the cutting area of the laser lathe at a given rate and is rotated to allow the laser beam to remove the desired pattern in the cylindrical stent. When one particular section of stent has been cut, the material is advanced to allow the next adjacent section of material to be cut. While current machines are able to cut the tubular material by moving the tube at about 0.3 inches per second, this invention allows the tube to be moved anywhere from 0.6 to 1 inch per second or higher depending upon the pattern to be cut in the cylindrical stent. Thus the invention substantially increases throughput while at the same time providing high quality stents with significantly reduced thermal stress.

This invention will be more fully understood in conjunction with the formal drawings and following detailed description.

DETAILED DESCRIPTION

The following description is meant to be illustrative only and not limiting. Other embodiments of this invention will be obvious from this description to those skilled in the art.

Figure 1:
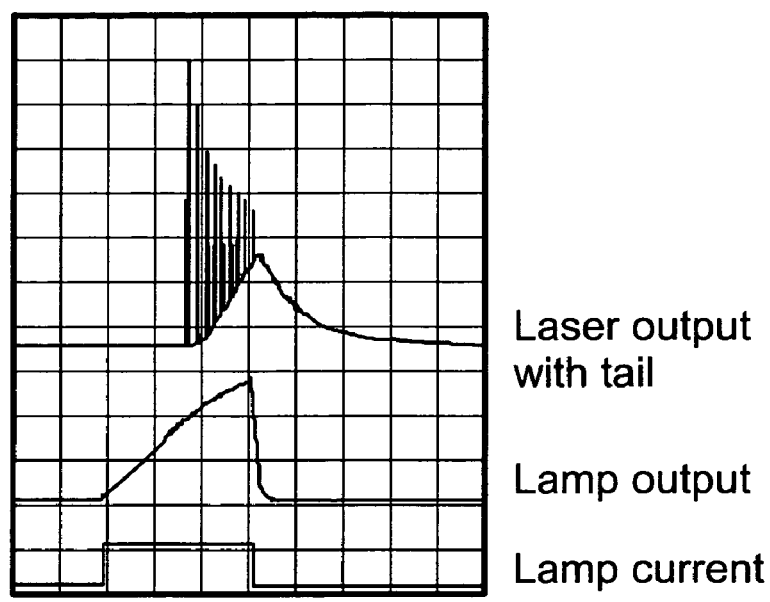
FIG. 1 shows a typical laser pulse of the type used in prior art laser milling along with the lamp output signal for pumping the laser and the lamp current.

FIG. 1 shows a typical prior art laser pulse generated by a neodymium yag (i.e., Nd:YAG) laser. As shown in FIG. 1, a lamp current is applied to a lamp which then pulses light into the lasing medium. The lamp is controlled by signals from a computer control which will be described later. The lasing medium receives energy from the light. As is well known in the laser arts, the energy contained within the lasing medium increases in an irregular way marked by sharp energy spikes which as time goes on decrease in magnitude and eventually dampen out. At the initiation of a sustained laser pulse, the lamp current is shut off and the laser output pulse then becomes steady (i.e. the sharp energy spikes disappear) but declines exponentially. The current control for the lamp current is shown at the bottom of FIG. 1 as a square wave. This square wave causes the lamp current in lamp 406 (see FIG. 4) to increase from the start of the current control pulse to the end of the current control pulse. When the current control pulse shuts off and goes to zero, the lamp current immediately stops and energy from the lamp no longer strikes the lasing medium with the exception of the residual radiation from the lamp filament which decays rapidly as shown by the lamp current curve versus time.

Lamp 406 (FIG. 4) is known as a flash lamp. Flash lamp 406 produces pulses with very short pulse widths which pump the Nd:YAG crystal. This pumping causes the active medium in the crystal to come up to a gain appropriate for lasing, at which point the active medium will produce what are called relaxation oscillations. These relaxation oscillations will be formed on the leading edge of the laser pulse. As the laser pulse grows in amplitude, a number of these relaxation oscillation spikes are generated (see the spikes in FIG. 1). As shown in FIG. 1, these spikes will reduce in amplitude as the main body of the pulse increases in amplitude until these relaxation oscillation spikes essentially get filtered out or cease.

When this happens, the leading edge of the main pulse will have reached the point where the energy in the focused laser spot is sufficient to melt the material being etched. At this time the laser pulse must be turned off. If the flash lamp is simply turned off at this time, which might be after 50, 60 or 80 microseconds, for example, then the fluorescent time constant, or the fluorescent decay time of the lasing crystal, will allow the laser pulse to decay with roughly a 230 microsecond decay period. This allows the crystal to lase for that period. Typically, the Nd: YAG crystal will lase for an initial melt pulse of 50 microseconds and the flash lamp 406 will then be turned off producing a tail of 100 to 200 microseconds trailing out after the main pulse. In accordance with this invention, a Q switch 408 (FIG. 4) has been added to the system to attenuate the gain in the laser cavity and cause the laser output pulse to shut off substantially instantly. The Q switch opens the feedback loop and thus prevents the Nd: YAG crystal from lasing.

The energy associated with the laser output pulse is directed toward the work piece being milled or etched. The energy in the laser output pulse causes the removed material to be elevated to a liquid phase. High pressure gas passing through a nozzle (not shown) coaxial with the laser beam blows the liquid out of the way. Should the laser energy be such that the material being removed vaporizes, then too much thermal has been placed into the material causing the remaining material adjacent the material being removed to be burned and thermally shocked (i.e., thermal stressed). When the adjacent material is burned it melts and fuses to cause rough edges and defects which can lead to material failure.

In one embodiment wherein a stent for use in unclogging blocked arteries is being fabricated, the material being milled is a tube and water is pumped down the tube to cool the tube while it is being etched. This water helps prevent the material being removed from vaporizing and thus reduces or eliminates thermal stress. Typically, the water flow rate is as high as can be obtained through the tube (up to a 2000 psi water source has been used). The flow rate can be from fractional liters per minute to tens of liters per minute. As the tube diameter increases, the water flow increases. While water is preferably used to cool the tube being laser milled, a specialized cooling fluid, known as a "cutting fluid", can be sent through the tube being etched so as to cool the laser-etched material. Cutting fluid is a commercially available product made, for example, by Castro or Shell. The commercially available cutting fluid is typically diluted to concentrations of 80 to 1 or 100 to 1 before being used. The cutting fluid is specially fabricated to reduce rusting of the steel components which are used throughout the system. In practice, we have discovered that pure clean water without any cutting oil, actually works better in eliminating the dross and in cooling. This is believed to be partly because the oil in the cutting fluid reduces the thermal transfer of heat from the metal to the liquid. The cutting fluid is also believed to reduce the ability of the material, once it has been melted and etched, to recast and reform. It is believed that the material might even coagulate or congeal around the oil thereby yielding less desirable results. Thus clean water is the preferred cooling fluid to be used in the laser milling of this invention. But as a practical matter, to prevent rusting the system's steel components, a small amount of cutting oil (for example, one part in eighty) is added to the cooling water.

The water passing through the tubing is in a turbulent flow regime. And the water can be filtered (by, for example, passing through a 20 micron filter) to remove dross, and then reused.

The faster the tube being machined goes though the laser milling, the more power must be used to ensure that the energy required to liquefy and thus allow to be removed the unwanted material is applied in a shorter time. This means that greater precision must be used in generating the start and stop of the laser pulse.

In accordance with this invention, the laser pulse energy is diverted from the material being etched at the end of a selected time by reducing abruptly the resonator cavity Q using an acousto-optic or electro-optic cell (sometimes called a switching transmission medium) in the laser resonator (i.e., a Bragg cell or a Pockels cell). Thus, the laser beam is abruptly terminated (i.e. truncated abruptly) and thus prevented from contacting the material being etched thereby preventing the material being etched from being thermal stressed.

Figure 2:
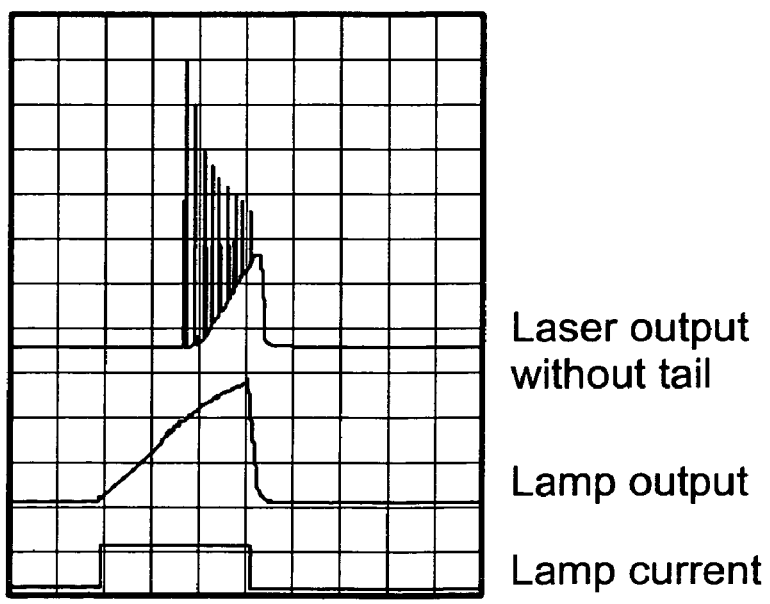
FIG. 2 shows a laser pulse in accordance with a process and system of this invention along with the lamp output signal for pumping the laser and the lamp current.

FIG. 2 shows the wave form of the current control, the lamp current and the laser output pulse in accordance with this invention. As shown in FIG. 2, the current control pulse is as in FIG. 1. The build up of the laser output pulse is also as in FIG. 1 showing a number of energy laser spikes which gradually decay (referred to as "relaxation oscillations"), followed by a laser output pulse which begins to decline exponentially and then abruptly drops vertically to zero. The lamp current is as in FIG. 1. The abrupt vertical drop to zero is caused by the Bragg cell or the Pockels cell being switched through the application of an acoustic RF signal, or other appropriate signal, respectively, to the cell.

By dropping the laser output pulse abruptly to zero, the residual energy in the fluorescent decay of the laser pulse is eliminated and thus prevented from striking the material being etched. This reduces or eliminates the thermal stress or thermal shock on the remaining material as seen in the prior art laser milling process. This further reduces the volume of slag, or of particles recast onto the edge.

Figure 3:
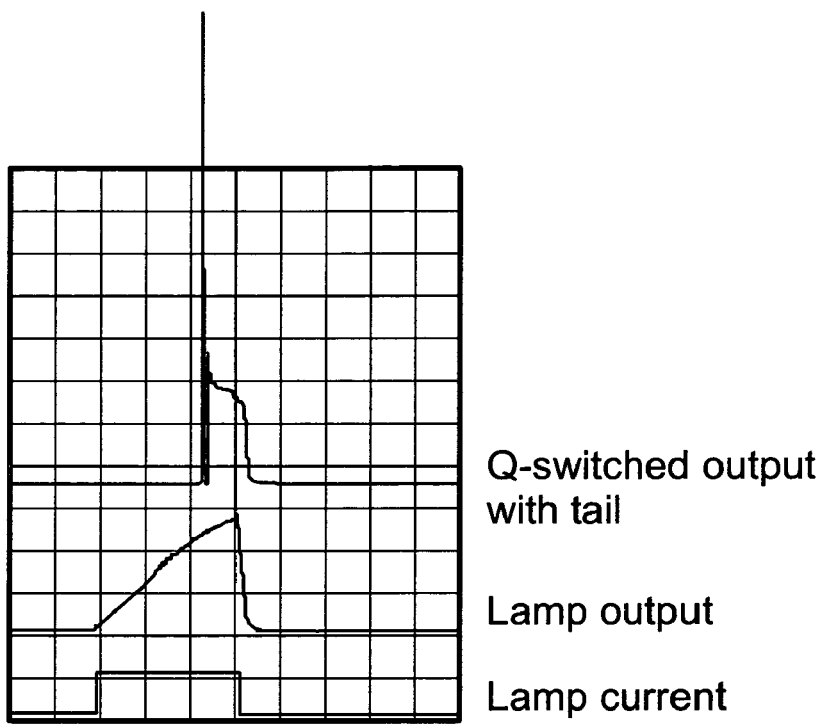
FIG. 3 shows a laser pulse in accordance with a process of this invention which produces a single Q switched pulse with a truncated tail along with the lamp output signal for pumping the laser and the lamp current.

FIG. 3 shows the current control signal, the lamp current and the laser output pulse in accordance with this invention for a Q switch pulse using a Q switch laser for laser milling. The Q-switched pulse has high peak power, but at a very narrow pulse width, so that the average power is low. This results in less heat being introduced to the work. The addition of a partial, and controlled, tail is considered to be of value when cutting materials such as silicon or ceramic.

If the RF is left on for a time during the initialization of the laser output, and then turned off, a Q-switched output pulse will be produced. If the RF is then turned on again past the time in which this pulse is produced, a tail such as illustrated in FIG. 3 will be produced. This tail will be adjustable in duration by changing the start and duration of this second RF on-time. The result will be a Q-switch pulse with a controlled tail. This will be of benefit when cutting materials such as silicon or ceramic.

Figure 4:
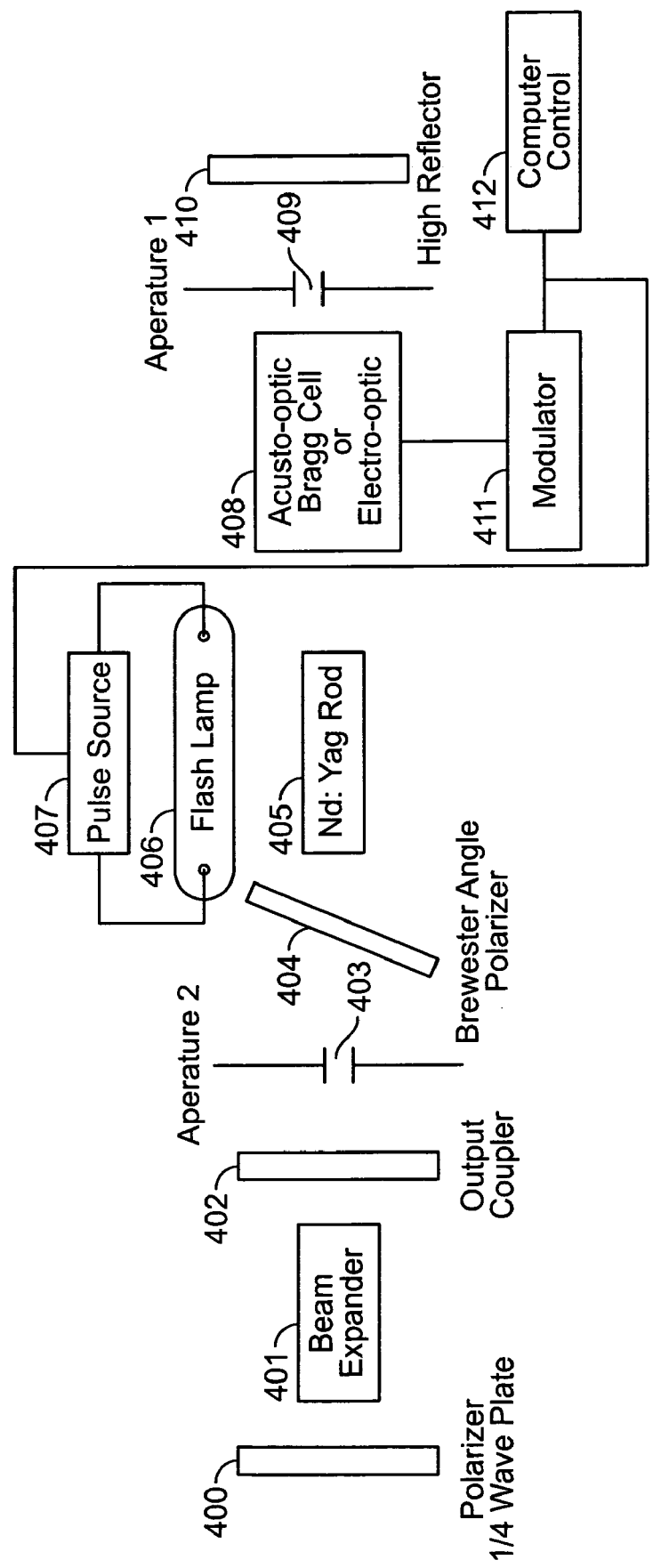
FIG. 4 shows a system constructed in accordance with this invention including a cell such as a Bragg cell between the lasing material and the transmission material to deflect the laser pulse during its fluorescent decay phase.

Turning to FIG. 4, one structure for producing laser pulses in accordance with this invention includes two cavities. One cavity is a pump cavity from the flash lamp to the Nd:YAG lasing medium and the other cavity is the resonator cavity which includes the structure between apertures 1 and 2 (shown in FIG. 4 as apertures 409 and 403, respectively) as well as the structure between the highly efficient reflector 410 and the output coupler 402. Approximately 35% to 40% of the lasing beam is transmitted through the output coupler 402.

The acousto-optic cell is typically a Bragg cell while the electro-optic cell is typically a Pockels cell.

Figure 5:
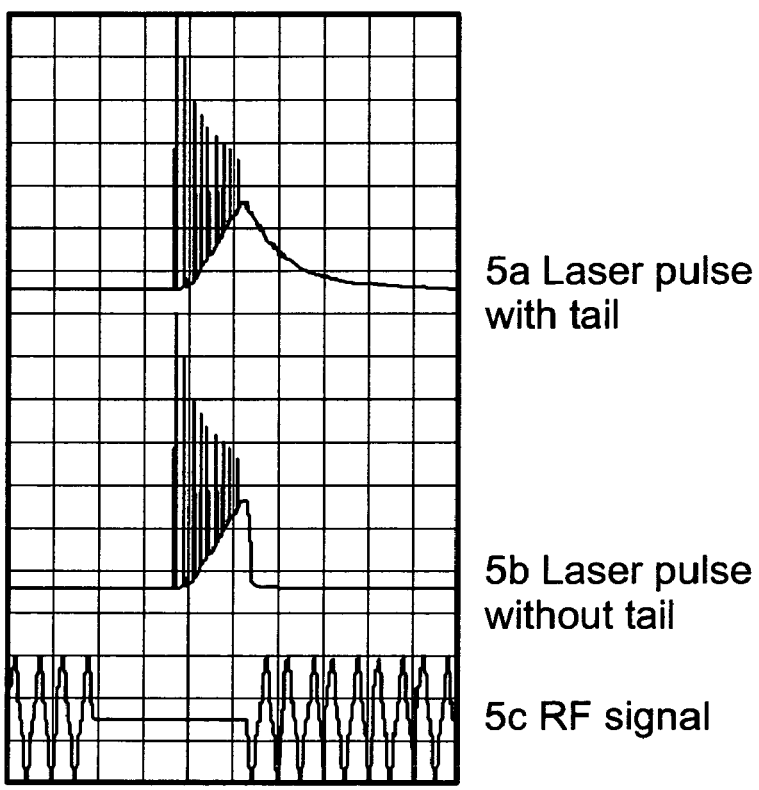
FIGS. 5a, 5b and 5c show, respectively, a laser pulse of the prior art, a laser pulse in accordance with this invention, and an RF signal of the type to be applied to the Bragg cell or the electro-optic cell to create the laser pulse of this invention.

The Bragg cell includes a quartz crystal with a high frequency transducer attached on one side. When an RF signal, such as a high power radio frequency signal of 27 MHz or so, is applied to the transducer, an RF compression wave propagates through the quartz crystal and changes the index of refraction of the material to cause the light being transmitted through the quartz crystal to bend as it passes through the crystal. The bent light cannot feed back between reflector 410 and the output coupler 402. Thus, there is insufficient gain available and the laser pulse extinguishes. When the RF signal is turned off, which happens in one cycle of a sine wave, the RF sine wave goes from the peak amplitude down to zero and then shuts off in one quarter wave cycle. At 27 MHz this takes about ten nanoseconds. When the RF signal is turned off, a laser pulse will be generated which will be transmitted to the work piece being etched. When the RF signal is turned on and applied again to the Bragg cell, the laser will be turned off (i.e. when the RF signal is applied to the Bragg cell, the laser cannot lase). The RF signal is shown in FIG. 5c.

FIG. 4 shows the system of this invention with the acousto-optic cell 408 placed within the laser cavity and controlled by modulator 411 driven by computer control 412 to modulate the laser beam being generated by the laser cavity. The system of FIG. 4 includes a lamp source 406 which is driven by a pulse from pulse source 407 also controlled by computer control 412. The energy from lamp 406 activates the neodymium (Nd:YAG) rod 405 in a well-known manner to produce a laser pulse with spikes of the type shown, for example, in FIG. 1. The current control pulse from pulse control 407 is also shown in FIG. 1 together with the lamp current which causes the lamp to energize the neodymium yag rod 405. At some point, the laser output pulse is passed through the acousto-optic cell 408, aperture 409 (typically 1 to 2 mm in diameter) to a highly efficient reflector 410 with a reflecting efficiency of approximately 99.99%. The pulse energy is then transmitted back through aperture 409 and through the acousto-optic cell 408 to the Brewster angle polarizer 404. The Brewster angle polarizer linearly polarizes the laser output signal. The linearly polarized laser output signal then passes through aperture 403 to output coupler 402 and through beam expander 401 which expands the beam before it passes through one-quarter wave plate polarizer 400. Polarizer 400 generates circular polarization so that the beam can be focused to a small spot with low aberration. This type of focusing system is well known. The resulting output signal from one-quarter wave plate polarizer 400 is then applied to the work piece through well-known optics to laser mill the work piece.

Computer control 412 produces an output signal which causes modulator 411 to apply an RF signal (for example, at 50 MHz) to the transducer on the side of the quartz crystal making up the acousto-optic Bragg cell 408. The resulting change in the refractive index of the quartz crystal causes a deflection of energy in the laser beam reflected from the highly efficient reflector 410. Consequently, the Q of the laser cavity is reduced below what is required to allow lasing. The laser pulse cuts off immediately as shown in FIG. 5b. Thus, in FIG. 5a, a laser pulse with a tail is shown. In FIG. 5b however, the acousto-optic Bragg cell 408 has been modulated by an RF signal controlled by modulator 411 such that when the RF signal is on, no lasing occurs in the laser cavity. However, when the RF signal is shut-off the laser system has a high Q and the laser pulse is able to be generated as shown in FIG. 5b. This laser pulse follows the characteristics of the laser pulse shown in FIG. 5a during the time that the RF signal is suppressed to zero. However, when the RF signal is again turned on, the Q of the laser cavity is again substantially reduced thereby almost instantaneously stopping lasing action. Thus the laser pulse as shown in FIG. 5b has a steep drop at the time that the RF signal is turned back on to modulate the Bragg cell 408. Consequently, no tail laser energy is applied to the part being etched and thermal stress is avoided in the etched material.

Placing the acousto-optic cell 408 in the laser cavity attenuates the gain to cut off the laser pulse whereas placing the acousto-optic cell outside the laser cavity would reduce the amount of energy reaching the part being milled but would not eliminate all of the tail, with the result that some energy from the tail would still strike the part being laser milled.

Figure 6:
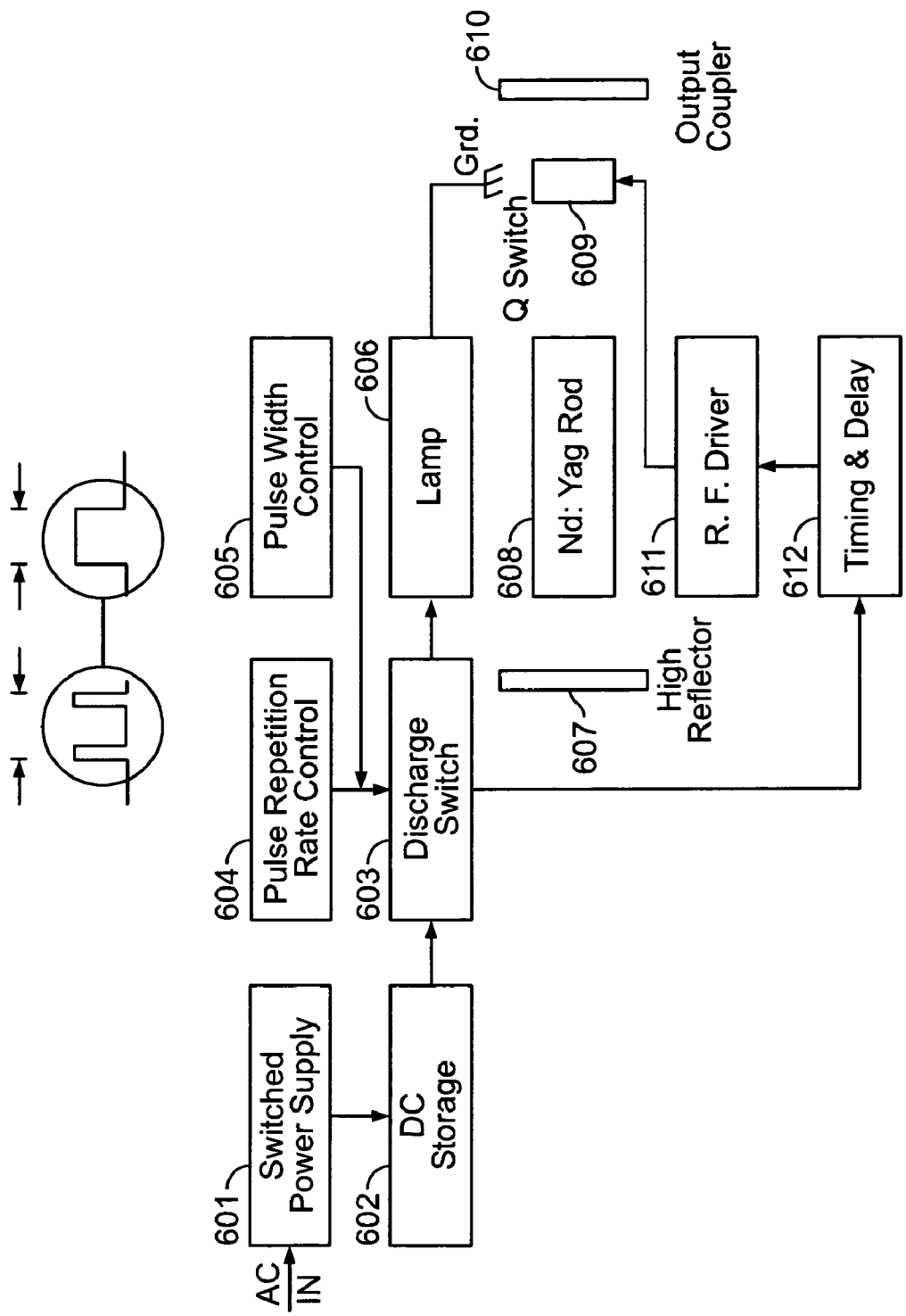
FIG. 6 shows a schematic block diagram of the control circuitry used to control the lamp and certain components of the laser system of this invention.

FIG. 6 illustrates at the block diagram level the control circuitry used to control the turning on of the lamp used to energize the lasing medium together with other relevant components of a system built in accordance with this invention. As shown in FIG. 6, an AC signal is supplied to switching power supply 601 which produces an output DC signal. This output DC signal is stored in DC storage element 602 (typically a filtered capacitor which stores charge and provides, within a given tolerance, a specified output voltage to the remainder of the system). Discharge switch 603 is controlled by a pulse repetition rate control signal from pulse repetition rate control circuitry 604. The pulse width is controlled by pulse width control 605. Pulse width control 605 provides a signal to cause discharge switch 603 to produce an output signal (such as the current control pulse in FIG. 1) to energize lamp 606 in a well known manner. Lamp 606 produces radiant energy which then is applied directly to lasing medium 608, typically a neodymium yag rod. In addition, discharge switch 603 provides signals to timing and delay circuitry 612 which controls RF driver 611. RF driver 611 produces an RF output signal of the type shown, for example, in FIG. 5c, which controls the status of Q switch 609. When an RF signal is applied to Q switch 609, the Q switch 609 deflects the beam to and from high reflector 607 which otherwise would be applied to output coupler 610 and thereby causes the Q of the lasing cavity to drop below that required to sustain lasing. Consequently, no energy is supplied through output coupler 610 to the material being milled and thus excessive heating of such material is avoided. As a result the laser milled material has smooth edges and little or no thermal stress.

Figure 7A:
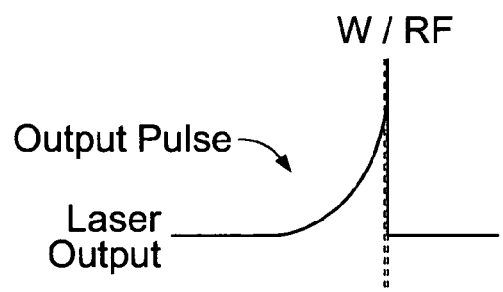
FIGS. 7a, 7b and 7c show, respectively, a laser pulse truncated in accordance with this invention, a lamp current control signal, and an RF signal to be applied to a laser pulse generating system to truncate the laser pulse and thus reduce or eliminate thermal stress on the part being laser milled.
Figure 7B:
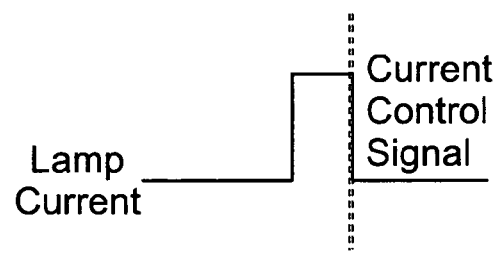
Figure 7C:
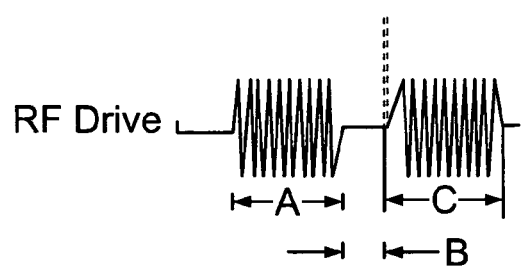

FIGS. 7a, 7b and 7c show the optical output signal produced by the structure of FIG. 6 as transmitted to output coupler 610. As shown in FIG. 7a, the output pulse from the lasing system drops abruptly to zero when the RF drive signal is restarted at time period C as shown in FIG. 7c. During time period A, the RF drive signal has been operating to prevent any optical output from the lasing system. During time period B, the RF driver produces no RF signal thereby allowing the output pulse to be generated from the lasing medium in response to the lamp signal (i.e. the "current control signal") shown in FIG. 7b. In time period C, the turning on of the RF output signal from RF driver 611 (FIG. 7c) causes the optical output signal (the "laser output pulse") from the lasing medium to drop abruptly to zero (i.e. to terminate) even though the lamp current as shown in FIG. 7b may still be energizing the neodymium yag rod 608.

Figure 8A:
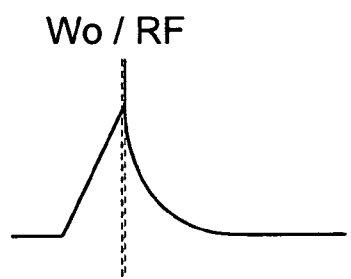
FIGS. 8a and 8b show, respectively, a prior art laser pulse with a fluorescent tail and a prior art current control pulse which terminates at the peak of the laser pulse.
Figure 8B:
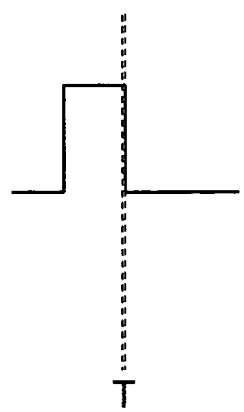

FIGS. 8a and 8b show respectively, an output pulse of the lasing medium from the coupler 610 without the RF signal being present. FIG. 8a shows that the tail of the output pulse exists even if the lamp current is abruptly cut off at time T as shown in FIG. 8b thereby causing excessive heating of the material being laser milled and causing rough edges on the kerfs of the milled material. Comparing FIGS. 8a and 7a, the elimination of the tail of the laser pulse in accordance with this invention is apparent.

Other embodiments of this invention will be obvious to those skilled in the laser milling arts in view of this disclosure.

What is claimed is:

1. A laser milling structure comprising:
   a lasing medium included in a lasing cavity, said lasing medium being capable of producing a series of laser pulses;
   a lamp for providing light to energize the lasing medium to produce said series of laser pulses;
   a reflector and an output coupler for reflecting and transmitting to a material being milled said series of laser pulses; and
   a cell contained in said lasing cavity responsive to an external signal to thereby deflect the energy reflected from the reflector and cause the Q of the lasing cavity to drop beneath a value sufficient to maintain lasing to thereby truncate any laser pulse being produced by the lasing medium.

2. Structure as in claim 1 wherein said cell contained in said lasing cavity comprises an acousto-optic Bragg cell.

3. Structure as in claim 1 wherein said cell contained in said lasing cavity comprises an electro-optic Pockels cell.

4. Structure as in claim 1 including
   a Brewster angle polarizer contained in said lasing cavity;
   an output coupler downbeam from said Brewster angle polarizer;
   an aperture between said output coupler and said Brewster angle polarizer;
   a beam expander downbeam from said output coupler; and
   a one-quarter wave plate polarizer downbeam from said beam expander;
   wherein said structure is capable of producing a series of laser pulses for use in milling a material.

5. Structure as in claim 1 including
   an aperture between said lasing medium and said reflector;
   wherein said cell is located between said aperture and said lasing medium.

6. Structure as in claim 5 including:
   a computer control for controlling the application of signals to said cell thereby to change the Q of said lasing cavity; and
   a modulator for receiving signals from said control and for producing signals to be applied to said cell.

7. Structure as in claim 6 wherein said modulator produces an RF signal to be applied to said cell.

8. Structure as in claim 7 wherein said RF signal is applied to said cell, said cell comprising an acousto-optic Bragg cell.

* * * * *